United States Patent
Grewe et al.

(10) Patent No.: US 9,607,229 B2
(45) Date of Patent: Mar. 28, 2017

(54) METHOD FOR REPRESENTING THE SURROUNDINGS OF A VEHICLE

(71) Applicants: Conti Temic microelectronic GmbH, Nuremberg (DE); Continental Teves AG & Co., oHG, Frankfurt (DE)

(72) Inventors: Ralf Grewe, Lindau (DE); Andree Hohm, Obernburg (DE); Hermann Winner, Bietigheim (DE)

(73) Assignees: Conti Temic microelectronic GmbH, Nuremberg (DE); Continental Teves AG & Co. oHG, Frankfurt (DE)

( * ) Notice: Subject to any disclaimer, the term of this patent is extended or adjusted under 35 U.S.C. 154(b) by 111 days.

(21) Appl. No.: 14/371,113

(22) PCT Filed: Apr. 30, 2013

(86) PCT No.: PCT/DE2013/100156
§ 371 (c)(1),
(2) Date: Jul. 8, 2014

(87) PCT Pub. No.: WO2013/189482
PCT Pub. Date: Dec. 27, 2013

(65) Prior Publication Data
US 2015/0003683 A1 Jan. 1, 2015

(30) Foreign Application Priority Data
Jun. 19, 2012 (DE) .................... 10 2012 105 332

(51) Int. Cl.
*G06K 9/00* (2006.01)
*G08G 1/16* (2006.01)
(Continued)

(52) U.S. Cl.
CPC ............ *G06K 9/00805* (2013.01); *B60R 1/00* (2013.01); *G06K 9/00624* (2013.01);
(Continued)

(58) Field of Classification Search
None
See application file for complete search history.

(56) References Cited

U.S. PATENT DOCUMENTS 5,006,988 A 4/1991 Borenstein et al.
5,768,434 A * 6/1998 Ran .................... H04N 11/042
375/E7.136
(Continued)

FOREIGN PATENT DOCUMENTS

DE 102009007395 10/2009
DE 102010011629 A1 * 1/2011 ......... G06K 9/00812
(Continued)

OTHER PUBLICATIONS

Schmid, Matthias R., et al. "Dynamic level of detail 3d occupancy grids for automotive use." Intelligent Vehicles Symposium (IV), 2010 IEEE. IEEE, 2010.*
(Continued)

*Primary Examiner* — Bhavesh Mehta
*Assistant Examiner* — Narek Zohrabyan
(74) *Attorney, Agent, or Firm* — W. F. Fasse

(57) ABSTRACT

A method for represents the surroundings of a vehicle with at least two levels of resolution in a surroundings model, preferably for a vehicle having a sensor system for monitoring the surroundings and at least one driver assistance system. The surroundings model preferably represents a probability grid having a plurality of grid cells. Data from at least two grid cells at a higher level of resolution are combined and stored in a grid cell at a lower level of resolution.

15 Claims, 3 Drawing Sheets

(51) Int. Cl.
*B60R 1/00* (2006.01)
*G06T 7/00* (2017.01)
*H04N 5/232* (2006.01)

(52) U.S. Cl.
CPC ........ *G06K 9/00791* (2013.01); *G06T 7/0022* (2013.01); *G08G 1/16* (2013.01); *H04N 5/23232* (2013.01); *G06T 2207/20221* (2013.01); *G06T 2207/30261* (2013.01)

(56) References Cited

U.S. PATENT DOCUMENTS

| | | | |
|---|---|---|---|
| 6,915,015 B1* | 7/2005 | Taubman | H04N 19/63 375/240.19 |
| 2004/0024779 A1* | 2/2004 | Perry | G06F 17/30961 |
| 2008/0252433 A1* | 10/2008 | Yguel | G08G 1/161 340/435 |
| 2009/0303234 A1* | 12/2009 | Becker | B60T 7/22 345/420 |

FOREIGN PATENT DOCUMENTS

| | | | |
|---|---|---|---|
| DE | 102010006828 | 8/2011 | |
| DE | 102011113016 A1 * | 3/2012 | ......... G06K 9/00791 |
| EP | 1 927 866 | 6/2008 | |
| WO | WO 2010/127650 | 11/2010 | |

OTHER PUBLICATIONS

International Search Report of the International Searching Authority for International Application PCT/DE2013/100156, mailed Aug. 29, 2013, 3 pages, European Patent Office, HV Rijswijk, Netherlands.
PCT International Preliminary Report on Patentability including English Translation of PCT Written Opinion of the International Searching Authority for International Application PCT/DE2013/100156, issued Dec. 23, 2014, 7 pages, International Bureau of WIPO, Geneva, Switzerland.
German Search Report for German Application No. 10 2012 105 332.4, dated Nov. 12, 2012, 5 pages, Muenchen, Germany, with English translation, 5 pages.
Gerhard K. Kraetzschmar et al., "Probabilistic Quadtrees for Variable-Resolution Mapping of Large Environments", 5$^{th}$ IFAC Symposium on Intelligent Autonomous Vehicles, Jul. 5, 2004, XP055076023, Ulm, Germany, 6 pages, section 3.
Foley, van Dam, Feiiner, Hughes, "Computer Graphics: Principles and Practice", Jan. 1, 1990, Pearson, XP002711611, pp. 548-555, section 12.6.3, figure 12.22.

* cited by examiner

METHOD FOR REPRESENTING THE SURROUNDINGS OF A VEHICLE

FIELD OF THE INVENTION

The invention relates to a method of representing surrounding of a vehicle by mapping data about the surrounding into a surroundings model.

BACKGROUND INFORMATION

Almost all known production-car driver assistance systems based on data of surroundings-covering sensor systems use an object-abstract model of the surroundings. Typically, an object list containing objects in the surroundings is provided. Object-free areas defining a potential maneuver space are not covered by such an approach. There are known approaches in research that propose the use of sensors that provide a piece of occupancy information about a defined region in the surroundings of the vehicle and plot said piece of information on a map of occupancy. The map of occupancy is preferably designed as a probability grid containing at least one probability value per grid cell, e.g., whether there is an object in this space segment in the surroundings of the vehicle, i.e., whether the cell is occupied. A probability grid requires a spatial discretization of the surroundings of the vehicle.

Aside from a discretization with a constant step size, discretization methods supporting various steps of resolution may be used, wherein known structures are, above all, quadtrees in the two-dimensional space and octtrees in the three-dimensional space based on a recursive subdivision of an area into quarters, which is shown in FIG. 1a by way of example. A tree-like data structure may be used to store the data (probability values), which is shown in FIG. 1b by way of example.

SUMMARY OF THE INVENTION

In view of the above it is an object of at least one embodiment of the present invention to specify a method for mapping surroundings into a model of the surroundings, particularly for a vehicle. The model of the surroundings can process and provide surroundings data in various steps of resolution.

At least one embodiment of the inventive method comprises mapping the surroundings of a vehicle into a model of the surroundings with at least two levels of resolution. The model of the surroundings is designed as a probability grid having a plurality of grid cells.

The phrase "different levels of resolution" means that the degrees of local resolution are different. At a high level of resolution, a predetermined region in the surroundings is represented by a larger number of grid cells than at a low level of resolution. The method is provided for a vehicle that comprises at least one sensor system for covering the surroundings and at least one driver assistance system. The sensor system provides the surroundings information for the model of the surroundings, and the function of the driver assistance system is based on the model of the surroundings created in this way. Data from at least two grid cells at a high level of resolution are combined and stored in a grid cell at a lower step of resolution.

BRIEF DESCRIPTION OF THE DRAWINGS

In order that the invention may be clearly understood, it will now be explained in further detail in connection with example embodiments thereof, with reference to the accompanying drawings, wherein:

FIG. 1b schematically represents a tree-like data structure corresponding to the sub-divided quadrant structure of FIG. 1a;

DETAILED DESCRIPTION OF PREFERRED EXAMPLE EMBODIMENTS OF THE INVENTION

Figure 1A:
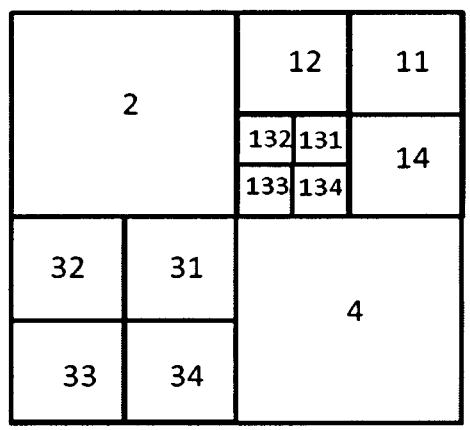
FIG. 1a schematically represents a recursive subdivision of each quadrant of an area respectively into sub-quadrants at a higher resolution.
Figure 1B:
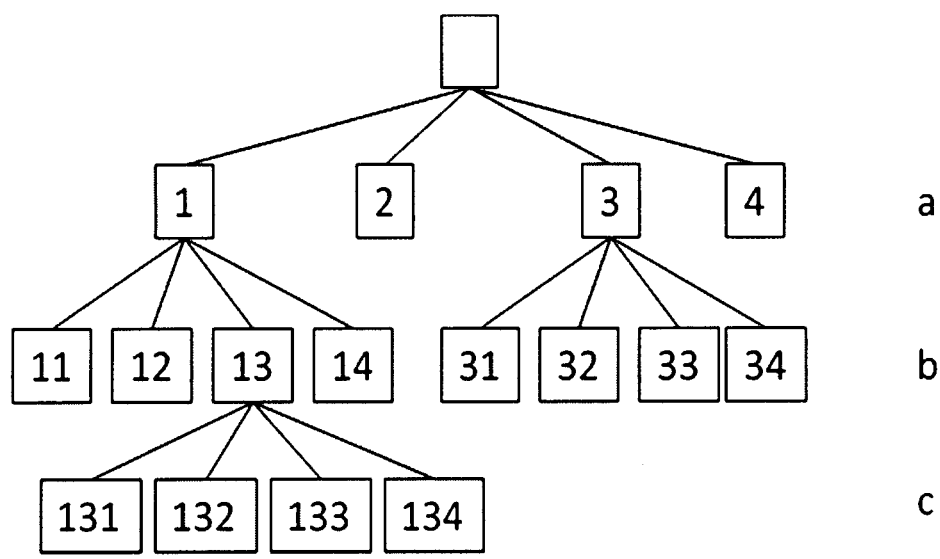

In principle, the data can be processed at various levels of resolution. FIG. 1b shows, by way of example, three levels of resolution (a, b, c) in the form of a tree structure. In particular, computing time for applications that require no high resolution can be saved by processing information at a low level (coarser resolution).

Since there are tree levels where no information is available, a method for generating information at a higher or a lower level is required. Since, in particular, information that is more finely resolved is not available at a higher level (step of resolution), the information of the next lower, occupied level is used.

In order to be able to access information of a lower level (e.g., step of resolution b in FIG. 1b), several cells having a higher resolution (e.g., step of resolution c in FIG. 1b) must be combined. Simple averaging for the processing of probabilities would produce an incorrect result when used in a model of the surroundings for a driver assistance system. This will be explained in the following example:

When the occupancy of one cell is determined to be 100% and three cells of the subgrid are unoccupied (0%), an occupancy of 25% (as the result of averaging would be) is not the correct result since the occupancy of the combined area is still 100%.

An embodiment of the inventive method provides that for combining at least two grid cells at a high level of resolution, the value of one of the at least two grid cells is taken over and stored in a grid cell at a lower step of resolution.

In a preferred realization of the invention, the at least two grid cells at a high level of resolution contain a probability value that indicates a probability of occupancy. The probability of occupancy indicates whether the corresponding region in the real world is occupied by, e.g., obstacles so that a vehicle cannot pass said region. The reduction in resolution makes the information about the position of the occupied region more inaccurate. However, information about the fact that there is an occupied region must not get lost. Thus, for combining, the maximum value of the grid cells at a high level of resolution is entered in a grid cell at a lower step of resolution.

Figures 2A, 2B:
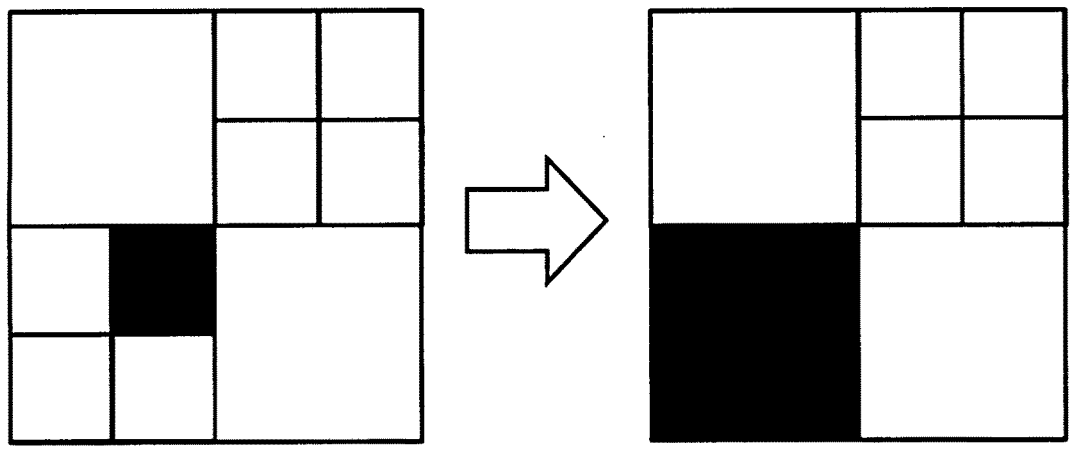
FIG. 2a schematically represents an occupancy grid in which a sub-quadrant or grid cell at a high level of resolution is occupied.
FIG. 2b schematically represents a manner of combining or taking-over the occupancy data from a sub-quadrant or grid cell at a high level of resolution as represented in FIG. 2a, as the data for a quadrant or grid cell at a lower level of resolution in FIG. 2b.

In FIG. 2, this process is shown, by way of example, for combining four cells. In FIG. 2a, the quarter or quadrant in the bottom left part of the probability grid comprises four cells. One of the four cells is occupied (indicated by black)

or is the cell with the maximum probability of occupancy of the four cells. FIG. 2b shows the combined quadrant at a lower step of resolution, and the whole area is black (which indicates that it is occupied) and features the maximum probability of occupancy of the four individual cells of FIG. 2a. Aside from a recursive subdivision into quarters or quadrants (plane, quadtree) or into eighths (spatial, octtree), any other subdivision is possible. This applies to all exemplary embodiments of the invention. In general, a natural-number subdivision $$\prod_{i=1}^{m} n_i; m, n_i \in \square; n_i \geq 2$$

is possible for each dimension m.

In a preferred realization of the invention, the at least two grid cells at a high level of resolution contain only a single probability value that indicates a probability of occupancy.

In a further positive realization of the invention, the at least two grid cells at a high level of resolution contain a probability value that indicates a probability of the presence of a free space. The probability of the presence of a free space indicates whether the corresponding region in the real world is free so that a vehicle can pass said region. For combining, the minimum value of the grid cells at a high level of resolution is entered in a grid cell at a lower step of resolution.

In a particular realization of the invention, the at least two grid cells at a high level of resolution contain only a single probability value that indicates a probability of the presence of a free space.

In a preferred realization of the invention, at least two probability values are stored in the at least two grid cells at a high level of resolution, namely a probability value that indicates a probability of occupancy and a probability value that indicates a probability of the presence of a free space. For combining the grid cells, the maximum value for the probability of occupancy, and the free-space value associated with the grid cell having the maximum value, at a high level of resolution are entered in a grid cell at a lower step of resolution.

In particular, the combining of the data is provided to be performed such that the minimum value of the grid cells at a high level of resolution is entered in a grid cell at a lower step of resolution, in a case in which a plurality of grid cells of the probability grid contain a value for a reflected energy of a radar sensor or lidar sensor or ultrasonic sensor.

In a further realization of the invention, a plurality of grid cells of the probability grid contain a value that indicates a height or a height gradient for this space segment, said value being provided by a camera sensor system. For combining, the minimum value of the grid cells or the maximum value of the grid cells at a high level of resolution is entered in a grid cell at a lower step of resolution.

Figure 3:
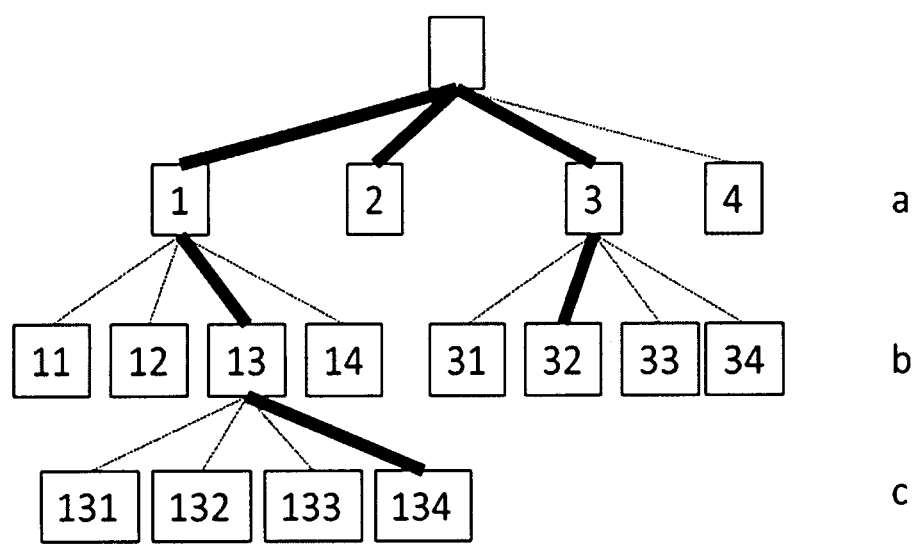
FIG. 3 schematically represents a data tree structure in which a reference or pointer to a grid cell at a higher level of resolution is stored in a grid cell at a lower level of resolution.

In another particular embodiment or realization of the invention, rather than taking-over an actual data value, a grid cell at a lower step of resolution stores a reference or pointer to that grid cell of a high level of resolution whose value is to be taken over. This is shown in FIG. 3 by way of example. The bold paths in FIG. 3 refer or point to a cell at a higher level of resolution.

It is thus possible to avoid a new calculation of the relevant values at a low level for each new access, and the relevant values can be stored in an efficient manner. To this end, each node at a high level contains a reference to the relevant node at a lower level in the form of, e.g., an indication of the respective quadrant.

The use of the method presented above is advantageous in a vehicle having at least two surroundings sensors for merging data of the sensors, said surroundings sensors differing in resolution. The method described may be employed in reverse order in order to merge several sensors. A low-resolution sensor A (FIG. 2b) is merged with a high-resolution sensor B (FIG. 2a). To this end, the lowly resolved information of sensor A is merged with the relevant information of the high-resolution sensor B.

The use of the method presented above is also advantageous in a vehicle having at least two driver assistance functions, wherein a first driver assistance system requires surroundings data having a higher step of resolution than surroundings data required by a second driver assistance system. The tree structure for storing the data with references to the relevant cells may be particularly used to transmit data efficiently in a network with several parties. A source transmits the tree up to the highest level of resolution to all receiving parties. The receiving parties reconstruct the tree up to the required level of resolution. For example, higher-order levels are ignored. In this way, those parties which do not require the maximum level of resolution can save storage locations and computing time.

The invention claimed is:

1. A method of mapping surroundings of a vehicle into a model of the surroundings of the vehicle,
    wherein the vehicle comprises a sensor system for monitoring the surroundings, and further comprises at least one driver assistance system;
    wherein the model of the surroundings has at least two levels of resolution including a higher resolution level and a lower resolution level, the model is configured as a probability grid having a plurality of grid cells including higher-level grid cells in the higher resolution level and lower-level grid cells in the lower resolution level, the model includes data values from the sensor system stored in at least two of the higher-level grid cells, and one of the lower-level grid cells is associated with the at least two higher-level grid cells; and
    wherein the method comprises:
    selecting a single selected data value among the data values stored in the at least two higher-level grid cells, and
    writing the selected data value into the lower-level grid cell that is associated with the at least two higher-level grid cells.

2. The method according to claim 1, wherein:
    the data values stored in the at least two higher-level grid cells comprise probability values that each respectively indicate a probability of occupancy of a respective area of the surroundings represented by the respective higher-level grid cell; and
    the selected data value is a maximum value among the probability values stored in the at least two higher-level grid cells associated with the lower-level grid cell.

3. The method according to claim 2, wherein the at least two higher-level grid cells contain only a single one of the probability values that indicates occupancy is probable, and the maximum value is the single probability value.

4. The method according to claim 1, wherein:
    the data values stored in the at least two higher-level grid cells comprise probability values that each respectively indicate a probability of presence of a free space in a respective area of the surroundings represented by the respective higher-level grid cell; and the selected data value is a minimum value among the probability values stored in the at least two higher-level grid cells associated with the lower-level grid cell.

5. The method according to claim 4, wherein the at least two higher-level grid cells contain only a single one of the probability values that indicates the free space is present, and the minimum value is the single probability value.

6. The method according to claim 1, wherein:
each one of the at least two higher-level grid cells contains two of the data values which comprise one occupancy probability value that indicates a probability of occupancy of a respective area of the surroundings represented by the respective higher-level grid cell, and one free-space probability value that indicates a probability of presence of a free space in the respective area of the surroundings represented by the respective higher-level grid cell; and
for determining the selected data value, a maximum value among the occupancy probability values is determined, and the free-space probability value of the higher-level grid cell having the maximum value is selected as the selected data value.

7. The method according to claim 1, wherein:
the data values comprise energy values for a reflected energy of a radar sensor or a lidar sensor or an ultrasonic sensor of the sensor system; and
the selected data value is a minimum value among the energy values of the at least two higher-level grid cells associated with the lower-level grid cell.

8. The method according to claim 1, wherein:
the data values comprise height values that indicate a height or a height gradient, and that are provided by a camera sensor of the sensor system; and
the selected data value is a minimum value or a maximum value among the height values of the at least two higher-level grid cells associated with the lower-level grid cell.

9. The method according to claim 1, wherein the sensor system includes at least two surroundings sensors respectively having differing resolutions, and wherein the method further comprises merging respective data from the at least two surroundings sensors to prepare the data values to be stored in the at least two higher-level grid cells.

10. The method according to claim 1, wherein the at least one driver assistance system includes a first driver assistance system that requires surroundings data having a relatively higher resolution and a second driver assistance system that requires surroundings data having a relatively lower resolution.

11. The method according to claim 1, further comprising providing the selected data value to the at least one driver assistance system, and controlling a functional operation of the at least one driver assistance system in response to and dependent on the selected data value.

12. A method for a vehicle having a sensor system, a driver assistance system, and a surroundings model configured as a probability grid or tree having parent cells in a lower level of resolution and child cells in a higher level of resolution, wherein each one of the parent cells respectively represents a respective area of surroundings of the vehicle at the lower level of resolution, and is respectively associated with a respective plurality of the child cells that together represent the respective area of the surroundings at the higher level of resolution, and wherein the method comprises:
a) with the sensor system, monitoring the surroundings of the vehicle and producing surroundings data;
b) recording individual data values of the surroundings data in the child cells;
c) selecting a respective single selected data value among the individual data values that were recorded in the child cells associated with a respective one of the parent cells;
d) recording the respective selected data value in the respective parent cell associated with the child cells among which the selected data value was selected;
e) providing at least the selected data value from the surroundings model to the driver assistance system; and
f) controlling a functional operation of the driver assistance system in response to and dependent on at least the selected data value provided in the step e).

13. The method according to claim 12, wherein the selected data value that is recorded in the respective parent cell is a maximum value or a minimum value among the individual data values that were recorded in the child cells associated with the respective parent cell.

14. A method for a vehicle having a sensor system, a driver assistance system, and a surroundings model configured as a probability grid or tree having parent cells in a lower level of resolution and child cells in a higher level of resolution, wherein each one of the parent cells respectively represents a respective area of surroundings of the vehicle at the lower level of resolution, and is respectively associated with a respective plurality of the child cells that together represent the respective area of the surroundings at the higher level of resolution, and wherein the method comprises:
a) with the sensor system, monitoring the surroundings of the vehicle and producing surroundings data;
b) recording individual data values of the surroundings data in the child cells;
c) selecting a single selected data value among the individual data values that were recorded in the child cells associated with a respective one of the parent cells;
d) recording, in the respective parent cell, a reference pointer which links the respective parent cell to the child cell that contains the selected data value;
e) retrieving the selected data value from the child cell that contains the selected data value, via the reference pointer which links from the respective parent cell to the child cell;
f) providing the selected data value to the driver assistance system; and
g) controlling a functional operation of the driver assistance system in response to and dependent on at least the selected data value provided in the step f).

15. The method according to claim 14, wherein the selected data value is a maximum value or a minimum value among the individual data values that were recorded in the child cells associated with the respective parent cell.

* * * * *